M. Stilwell.
Bee Hive.
Nº 33,548.    Patented Oct. 22, 1861.
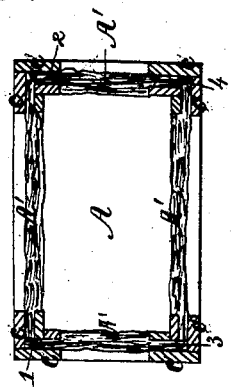
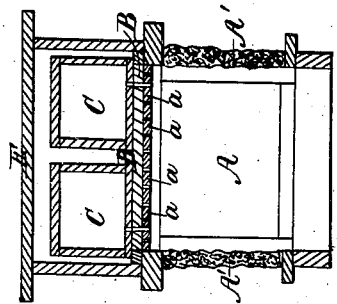
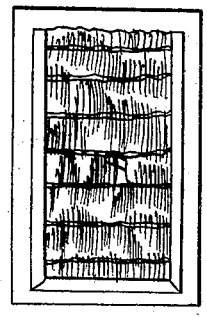
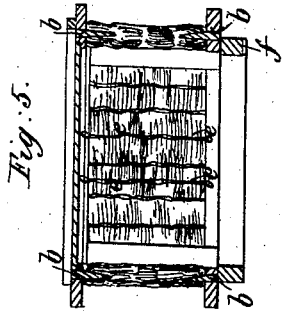
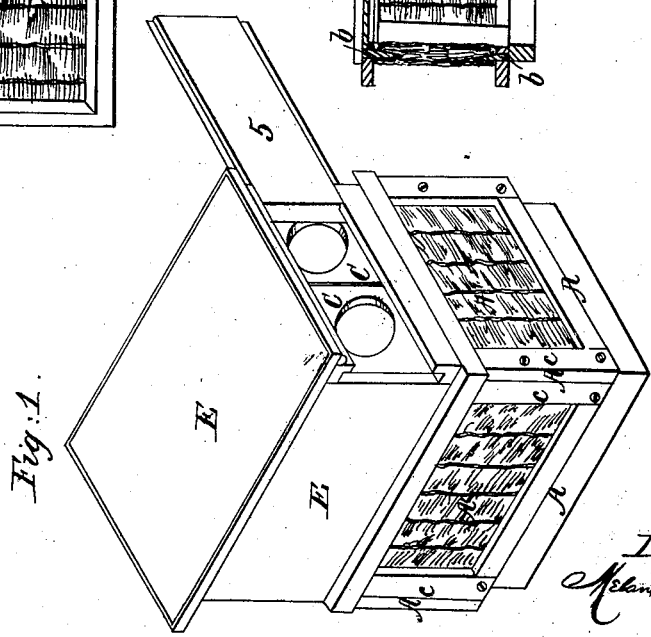
Witnesses,    Inventor,
E. D. Claff    Melancthon Stilwell
Chas. H. Burch    Per Clayton & Son
    Attys

UNITED STATES PATENT OFFICE.

MELANCTHON STILWELL, OF MANLIUS, NEW YORK.

IMPROVEMENT IN BEE-HIVES.

Specification forming part of Letters Patent No. 33,548, dated October 22, 1861.

*To all whom it may concern:*

Be it known that I, MELANCTHON STILWELL, of Manlius, Onondaga county, State of New York, have invented certain new and useful Improvements in Straw Bee-Hives; and I do hereby declare that the following is a full and exact description thereof, reference being had to the accompanying drawings, and to the letters of reference marked thereon.

In the drawings similar characters refer to like parts.

Figure 1 is a general isometrical view of the hive. Fig. 2 is a vertical section across the hive. Fig. 3 is a horizontal section showing the mode of confining the straw mats, which form the sides of the hive in the wooden frame-work. Fig. 4 is a plan showing the movable straw mat in the place of the honey-board. Fig. 5 is a longitudinal vertical section of the hive below the honey-boxes.

To enable those skilled in the art to make and use my invention, I will describe its construction and operation.

The nature of my invention consists more particularly in the manner herein set forth of adapting straw to the construction of bee-hives.

The general appearance or plan of my hive—the use of the slats and the movable honey-boxes—is not dissimilar to that of some other hives. Straw, on account of its being a non-conductor of heat and cold and an absorbent of moisture, has long been regarded as perhaps the best material for hives; but in view of the difficulty of putting it into the required shape it has not been well adapted to the construction of hives with movable boxes, &c.

A is the hive proper, with its four sides A', of straw matting, made very close and thick. It is in this chamber that the swarm dwells, and it is from the slats $a\ a$ that they suspend their combs which contain the honey for their own sustenance. Above these slats is the honey-board B. In the working season the surplus honey-boxes C are placed on this board and communicate through a slot in the honey-board with the hive A. When the working season is over, the honey-board B is removed and the straw mat D is substituted, thus keeping out the cold and retaining the heat, and allowing the moisture generated among the bees, which is so detrimental, to evaporate. E is the cover which incloses the honey-boxes, and has a slide-door 5 for the purpose of observing the condition of the boxes.

It will be seen that the four thick woven straw-mats, which compose the four sides of the hive, (see Fig. 3,) are so formed at their ends as to fit closely into the clamping-corners 1, 2, 3, and 4. The end mats are further secured by means of hard wooden pegs $b$, which are driven through the upper and lower moldings of the frame into the mats. The side mats are further secured by having the cords $e$, forming their warp, secured to the inner portion of the frame. When the screws are taken out of the clamp corner-boards $c$, the mats can be removed for repairs. The bees enter the hive at the slot $f$.

The peculiar manner in which I construct my hive will very fully appear by reference to the accompanying drawings, forming a part of this specification.

Having thus fully described the construction and operation of my invention, what I claim as new, and desire to secure by Letters Patent, is—

1. Constructing bee-hives of straw by securing the straw mats A' to the wooden frame by means of the clamping corner-boards $c$, pegs $b$, and cords $e$, substantially as herein set forth and described.

2. The straw mat D, when constructed and used as and for the purposes set forth and described.

MELANCTHON STILWELL.

Witnesses:
  J. W. MANTLER,
  ISAAC V. V. HIBBARD.